United States Patent [19]

Nishimura et al.

[11] 4,389,253

[45] Jun. 21, 1983

[54] PROCESS FOR REMOVING CRUD FROM ION EXCHANGE RESIN

[75] Inventors: Shigeoki Nishimura, Katsuta; Toshio Ogawa, Takahagi; Katsuya Ebara, Mito; Sankichi Takahashi, Hitachi, all of Japan

[73] Assignee: Hitachi, Ltd., Tokyo, Japan

[21] Appl. No.: 315,736

[22] Filed: Oct. 28, 1981

[30] Foreign Application Priority Data

Oct. 30, 1980 [JP] Japan .................. 55-153358
Dec. 8, 1980 [JP] Japan .................. 55-172036

[51] Int. Cl.³ .................................................. B08B 3/12
[52] U.S. Cl. ...................................... 134/1; 134/25.1; 210/670; 210/682; 210/748; 204/157.1 S
[58] Field of Search .............. 204/157.1 S; 210/670, 210/674, 675, 676, 677, 682, 738, 748, 206, 207, 208, 243, 269, 280; 134/1, 25.1

[56] References Cited

U.S. PATENT DOCUMENTS

| | | | |
|---|---|---|---|
| 2,683,695 | 7/1954 | Dwyer | 210/670 |
| 2,717,874 | 9/1955 | Verain | 204/157.1 S |
| 3,663,163 | 5/1972 | Depree | 210/674 |
| 3,700,592 | 10/1972 | Depree | 210/674 |
| 3,849,196 | 11/1974 | Halloway | 134/1 |
| 3,882,018 | 5/1975 | Depree | 210/674 |
| 3,941,693 | 3/1976 | Depree | 210/674 |
| 3,977,968 | 8/1976 | Odland | 210/677 |
| 4,080,418 | 3/1978 | Carlberg | 210/670 |
| 4,083,782 | 4/1978 | Kunin | 210/674 |
| 4,110,209 | 8/1978 | Vogel | 210/738 |
| 4,205,966 | 6/1980 | Horikawa | 210/748 |

FOREIGN PATENT DOCUMENTS 54-2631 2/1979 Japan .

*Primary Examiner*—Ernest G. Therkorn
*Attorney, Agent, or Firm*—Thomas E. Beall, Jr.

[57] ABSTRACT

In discarding the used ion exchange resin by the demineralizer provided in the cooling system of an atomic reactor, the radioactivity-rich ion exchange resin and the radioactivity-rich crud can be treated separately by introducing 0.5% by weight of sodium hexamethaphosphate into a slurry of the ion exchange resin, irradiating supersonic of 20 to 60 kHz in frequency to the slurry of the ion exchange resin and removing the radioactive crud from the ion exchange resin.

16 Claims, 11 Drawing Figures

PROCESS FOR REMOVING CRUD FROM ION EXCHANGE RESIN

BACKGROUND OF THE INVENTION

The present invention relates to the clarification of the contaminated ion exchange resin and particularly, it relates to a process for removing crud (a product produced by corrosion and erosion) and an apparatus therefor.

As disclosed in the Japanese Patent Publication No. Sho 54-2,631 (the invention disclosed in this Patent Publication was also filed in the United States on May 20, 1970 as an abandoned U.S. Patent Application No. 39,030), ion exchange resin has extensively been used in the clarification of water which is used in a power plant. In the above said publication, a process for removing crud from the used ion exchange resin by applying supersonic energy has been described. However, it was confirmed by the present inventors that the removal rate of crud by use of the process was at most as low as about 20%.

SUMMARY OF THE INVENTION

An object of the present invention is to elevate the removal rate of crud from this ion exchange resin.

The characteristic feature of the present invention resides in introducing a dispersing agent into a slurry of the used ion exchange resin to which a sludge adheres and further separating crud from the ion exchange resin by applying supersonic energy thereto while dispersing the crud, separated from the ion exchange resin by the action of the dispersing agent, in the slurry in a stable condition.

The dispersing agent as defined herein includes those which create the condition in which the crude once separated by application of supersonic energy does not readhere to the ion exchange resin and have any one of the following actions.

One action is to cover the separated crud, reduce the affinity of the crud to the ion exchange resin, increase the static repellence force to the ion exchange resin, thereby dispersing the crud as a colloid in the slurry and stabilizing the same.

Another action is to increase the repellence force of the crud with each other by elevating the surface electric charge of the crud taking advantage of the pH-lowering action of the dispersing agent, thereby dispersing the colloid in the slurry and stabilizing the same.

Examples of the dispersing agents having the first action include all sorts of chelating agents such as hexamethaphospholic acid, polyphospholic acid and salts thereof, EDTA, acetylacetone, dibenzoylmethane, 1,1,1-trifluoro-3-(2-(2-thenoyl)acetone, ammonium salt of N-nitrosophenylhydroxylamine, N-benzoyl-N-phenyl hydroxylamine, 1-nitroso-2-naphthol, 2-nitroso-1-naphthol, 8-quinolynol (oxine), α-benzoinoxime (taplone), monothiodibenzoylmethane, 1,1,1-trifluoro-3-(2-thiothenoyl)-acetone, dimethylglyoxime, α-benzyldioxime, diphenylthiocarbazone (dithizone), 8-quinolinethiol (thiooxine), sodium salt (Kupral), silver salt, cupper salt, zinc salt and ammonium salt of diethyldithiocarbamic acid, toluene-3,4-dithiol (dithiol), 1-(2-pyridylazo)-2-naphthol and the like.

Examples of the dispersing agents having the second action include acids. As mentioned later, it is necessary to bring the pH of the slurry of 2 or below by the addition of the acid. It has become apparent that sulfuric acid is preferred from the consideration of the application in the atomic reactor.

DESCRIPTION OF THE PREFERRED EMBODIMENT

In an atomic power plant, for example, an atomic power plant of boiling water type reactor, there is provided a condensate demineralizer and a condensate demineralizer filter in the water feed pipe feeding cooling water to a pressure vessel of an atomic reactor from a condenser. The condensate demineralizer has accumulated layers consisting of the packed granular cation exchange resin and the packed granular anion exchange resin therein. When described simply as granular ion exchange resin, these two ion exchange resins are involved. The condensate filter has a filter elements obtained by precoating a mixture of the powdered cation exchange resin and the powdered anion exchange resin on a holder. The powdered ion exchange resin is a general term of these two powdered ion exchange resins. The mean particle diameter of granular ion exchange resin is about 500 $\mu$m and that of the powdered ion exchange resin is about 50 $\mu$m.

The crud formed in the main steam feeding pipe and in the water feeding pipe in the upstream of the condensate demineralizer filter, of atomic power plant of boiling water type reactor, is removed by means of a condensate demineralizer filter. The particle diameter of crud is about 1 to 10 $\mu$m. When the crud is removed, a film of crud is formed on the powdered ion exchange resin in the condensate demineralizer filter, thereby causing an elevation of pressure-loss. Consequently, when the differential pressure of the condensate demineralizer filter reaches 1.5 to 20 kg/cm$^2$, regeneration of the condensate demineralizer filter should be carried out by reversal washing of the condensate demineralizer and by the use of chemicals. Reversal washing is an operation of removing crud and regeneration by chemicals is an operation or removing ions. However, the ion exchanging capabilites of the granular ion exchange resin can not thoroughly be recovered even by these operations. With the repetition of the reversal washings and regeneration operations, the ion exchanging ability of the granular ion exchange resin becomes deteriorated and at least the resin is disposed as radioactive wastes.

The frequency of reversal washing is generally once per 10 to 15 days and the amount of ion exchange resin washed per each reversal washing is in the range from 5 to 10 m$^3$ in the boiling water reactor of electric output of 1100 Mwe.

Figure 1:
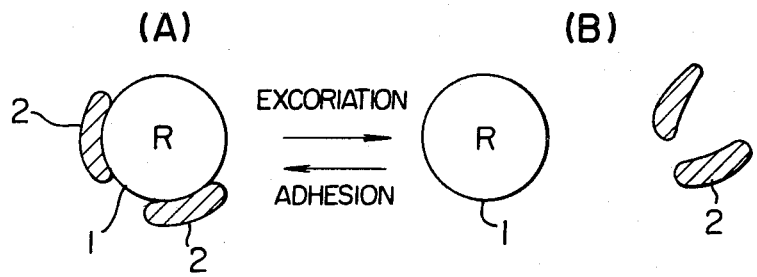
FIG. 1 is an illustration showing the adhesion and excoriation of crud to and from the granular ion exchange resin.

The crud formed in the atomic power plant of the boiling water type reactor comprises mainly $\alpha$-hematite ($\alpha$-Fe$_2$O$_3$). An oxide of iron has a strong ion exchanging ability. The crud is also apt to adsorb radioactive ions such as Co$^{60}$ in the cooling water. The crud in the cooling water of the atomic power plant is usually positively charged and has a hydrophobic surface characteristic. Hence, the crud adheres rather strongly to the surface of the cation exchange resin whose surface is negatively charged by the static attraction and van der Waals affinity force. Adhesion state of crud to the granular ion exchange resin and the powdered ion exchange resin is shown in FIG. 1(A) and FIG. 2(A), respectively. The crud is removed from the granular ion exchange resin layers in the condensate demineralizer by the above-mentioned two phenomena. FIG. 1(A) shows the adhesion state of crud by the first phemonenum. In FIG. 1, the numeral 1 is the granular cation exchange resin and the numeral 2 is the crud. As mentioned above, crud 2 is positively charged, and hence it is likely to be adsorbed to the surface of the granular cation exchange resin 1. Crud 2 thus adhered electrically to the surface of the granular ion exchange resin is not separated from the surface of the granular ion exchange resin even by reversal washing of the granular ion exchange resin. The crud captured by the second phenomenum so as to occupy the space between the adjacent mutual granular ion exchange resins in the granular ion exchange resin layer can be removed easily by reversal washing. When the crud is adhered to the granular ion exchange resin by the first phenomenum, the part of the granular ion exchange resin on which the crud is adsorbed is not sufficiently regenerated by chemicals and it is difficult to restore the ion exchanging of said part of the ion exchange resin.

Figure 2:
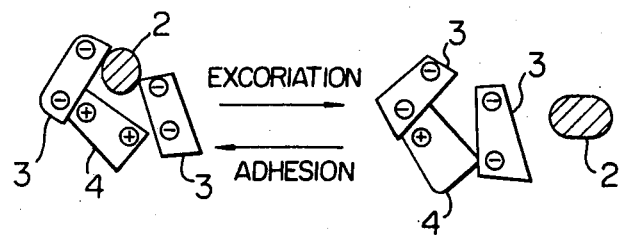
FIG. 2 is an illustration showing the adhesion and excoriation of the crud to and from the powdered ion exchange resin.

In FIG. 2, the numeral 3 is the powdered cation exchange resin, and the numeral 4 is the powdered anion exchange resin. Since the powdered ion exchange resin (particle diameter: 2 to 90$\mu$) has a very small particle diameter as compared with the granular ion exchange resin (particle diameter: 0.25 to 1.2 mm), the powdered cation exchange resin 3 and the powdered anion exchange resin 4 attract mutually and strongly by the static force, thereby forming a block. In such powdered ion exchange resin, the crud adheres to the powdered cation exchange resin 3 more strongly than the granular cation exchange resin. When the pressure-loss of the condensate demineralizer filter reaches a predetermined level, the condensate filter is washed reversibly as mentioned above. The powdered ion exchange resin wasted by this reversal washing still has an ion-exchanging function and, therefore, said function is not utilized efficiently.

In order to utilize efficiently the ion exchanging ability of the granular ion exchange resin and the powdered ion exchange resin, removal of crud from the respective ion exchange resin on which the crud is adsorbed is considered sincerely. Since such crud is not separated from the ion exchange resin by the shearing force of the conventional stirring, it is necessary to separate the crud from the ion exchange resin by applying a stronger shearing force. The process disclosed in the Japanese Patent Publication No. Sho 54-2631 is an effective resolving measure therefor which utilizes cavitation formed in the solid-liquid boundary area by the application of supersonic energy. According to this method, as shown in FIG. 1(B) and FIG. 2(B), the crud can be separated from the ion exchange resin. But, when application of the supersonic is stopped, the crud separated by the adsorbing force such as electric attraction or the like is again adsorbed on the surface of the ion exchange resin. Therefore, the separation rate of crud adhered to the iron exchange resin is extremely small. The separation rate of crud from either one of the granular and the powdered ion exchange resins is about 20%. In the case of the powdered ion exchange resin having a very strong static attraction, the separation rate of crud is further smaller as compared with the granular ion exchange resin.

For the purpose of preventing the readhesion phenomena, a dispersing agent is added according to the present invention. The dispersing agent charges the surface of crud either positively or negatively and disperses the crud by taking advantage of the static repellence force formed among the mutual cruds, making it possible to obtain the colloidally stabilized condition.

Figure 3:
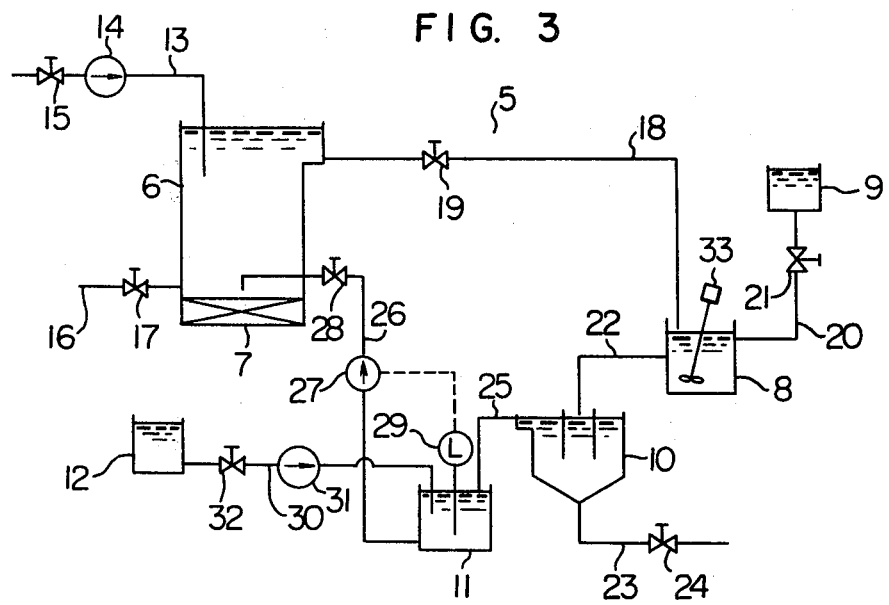
FIG. 3 is a system drawing of an apparatus for separating crud to which a preferred example of the present invention is applied.

FIG. 3 shows an apparatus realizing the process for separating the crud from the ion exchange resin. Said crud-separating apparatus 5 consists of crud-separating tank 6, supersonic transmitter 7, crud-precipitating vessel 10 and dispersing agent blending tank 11. The supersonic transmitter 7 is provided at the bottom of the crud-separating tank 6. Resin feed pipe 13 and resin discharge pipe 16 are communicated with the crud-separating tank 6. Pipe 14 and valve 15 are set on the resin feed pipe 13. The resin feed pipe 13 is connected with at least one of the condensate demineralizer and condensate demineralizer filter. The demineralizer filter obtained by precoating the powdered ion exchange resin on a holder is also set in the reactor clean-up system of a boiling water type reactor. The resin feed pipe 13 is also connected with this demineralizer filter. Valve 17 is installed on the resin discharge pipe 16. Pipe 18 having valve 19 communicates the crud-separating tank 6 with blending tank 8. Pipe 20 set on the coagulating agent tank 9 is connected with the blending tank 8. Valve 21 is set on the pipe 20. Stirrer 33 is inserted into the blending tank 8. Pipe 22 communicates the blending tank 8 with the crud-precipitating vessel 10. Crud-discharge pipe 23 having valve 24 is connected with the crud-precipitating vessel 10. Pipe 25 connected with the crud-precipitating vessel 10 is communicates with the dispersing agent blending tank 11. Level gauge 29 is set in the dispersing agent blending tank 11. One end of pipe 26 in which pump 27 and valve 28 are set is connected with the dispersing agent blending tank 11 and the other end thereof is inserted into the crud-separating tank 6. Pipe 30 connects the dispersing agent blending tank 11 with dispersing tank 12. Pump 31 and valve 32 are set in the pipe 30.

The powdered ion exchange resin discharged by reversal washing with water supplied from the condensate filter is fed to the crud-separating tank 6 through the resin feed pipe 13 in the form of slurry. The powdered ion exchange resin is precipitated in the bottom of the crud-separating tank 6. Water containing the dispersing agent (for example, a sort of the dispersing agent mentioned above) present in the dispersing agent blending tank 11 is fed to the crud-separating tank 6 via the pipe 26 by driving the pump 27 and mixed with the slurry of the powered ion exchange resin. The supersonic transmitter 7 is operated in such condition to irradiate the supersonic to the powdered ion exchange resin. The crud adhering to the powdered ion exchange resin is separated from the powdered ion exchange resin by the action of supersonic. The crud separated moves upwards to the top of the crud-separating tank 6 while being irradiated with supersonic. On the other hand, the powdered ion exchange resin is present in the bottom of the crud-separating tank 6. Such phenomenon occurs even when the feed of all liquids, particularly water from the pipe 26 to the crud-separating tank 6 is stopped. This is because the particle diameter of crud is smaller than that of the powdered ion exchange resin and because the action of the supersonic works. When the valve 19 is opened, water containing the crud flows into the blending tank 8 via the pipe 18. The coagulating agent in the coagulating agent tank 9 is fed to the blending tank 8 by opening the valve 21. The coagulating agent serves to neutralize the surface charge of crud and weaken the repellence force thereof, and usually polyanionic or nonionic coagulating agent is employed. Water containing the coagulating agent and the crud is blended homogeneously by the operation of the stirrer 33. Subsequently, the water is fed to the crud-precipitating tank 10. The crud is precipitated in the crud-precipitating tank 10 and accumulated in the bottom of the tank 10. Precipitation of the crud is accelerated by the action of the condensing agent. The supernatant water not containing the crud is fed to the dispersing agent blending tank 11. The concentration of dispersing agent in the dispersing agent blending tank 11 is measured. When the concentration is low, the pump 31 is rotated to feed the dispersing agent in the dispersing agent tank 12 to the dispersing agent blending tank 11. When the concentration of the dispersing agent in the dispersing agent blending tank 11 reaches the predetermined level, rotation of the pump 31 is stopped and feed of the dispersing agent to the dispersing agent blending tank 11 is stopped. When the liquid level is below the predetermined level in the dispersing agent blending tank 11, the pump 27 does not work. The crud (adsorbing radioactive ions such as cobalt 60 and the like) which was precipitated in the bottom of the crud-precipitating tank 10 is taken out through the pipe 23 by opening the valve 24 and treated as radioactive wastes. The powdered ion exchange resin from which the crud was separated, is discharged into the resin discharge pipe 16 from the crud-separating tank 6.

The separation characteristics of the powdered ion exchange resin treated by the use of an apparatus shown in FIG. 3 are shown below.

Figure 4:
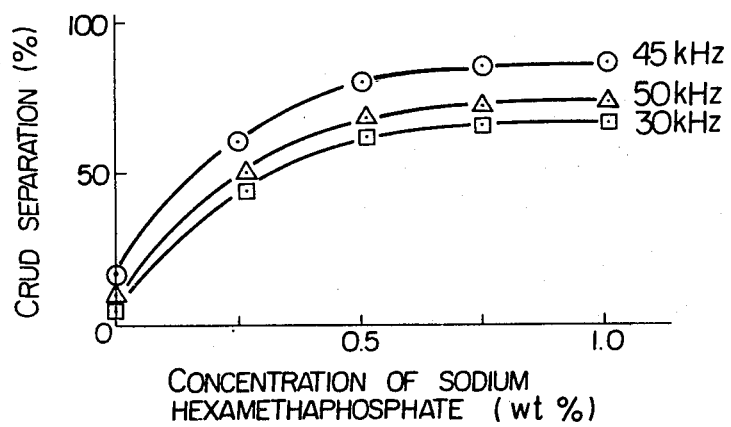
FIG. 4 is a characteristic figure showing the relation between the concentration of sodium hexamethaphosphate and the separation rate of crud.

FIG. 4 shows the characteristics obtained after sodium hexamethaphosphate, one of the chelating agents, was blend as a dispersing agent with the slurry of the powdered ion exchange resin and supersonic of 30 kHz, 45 kHz and 50 kHz in frequency was irradiated to the powdered ion exchange resin. Separation of the crud did not change so much even when the concentration of hexamethaphosphate reached 0.5% by weight or higher.

Figure 5:
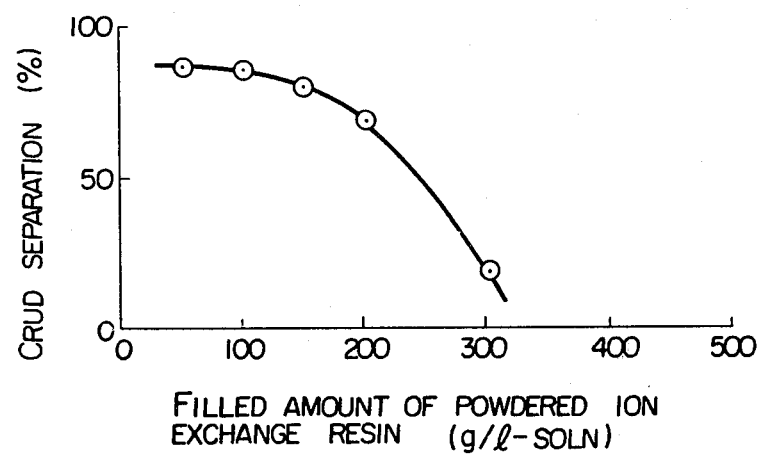
FIG. 5 is a characteristic figure showing the relation between the amount of the powdered ion exchange resin packed and the separation rate of crud.
Figure 6:
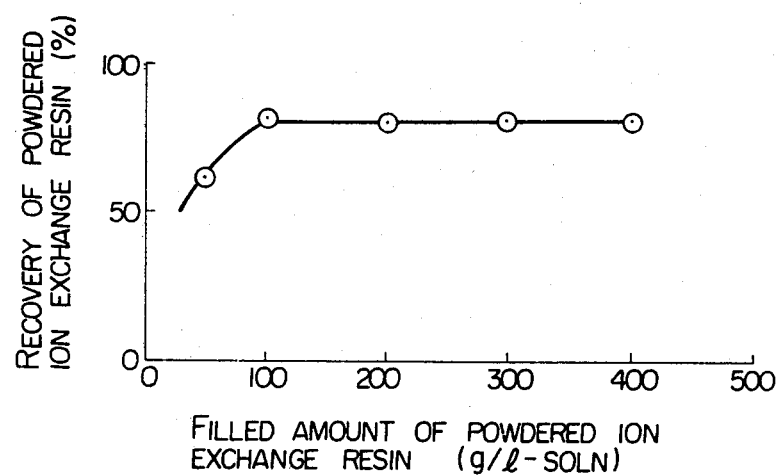
FIG. 6 is a characteristic figure showing the relation between the amount of the powdered ion exchange resin packed and the recovery rate of the powdered ion exchange resin.

FIGS. 5 and 6 show the relation between the filled amount of the powdered ion exchange resin based on the water in the crud-separating tank 6 and separation rate of the crud, and the relation between the filled amount of the powdered ion exchange resin and the recovery rate of the powdered ion exchange resin, respectively. As the dispersing agent, there was used a solution containing 0.5% by weight of sodium hexamethaphosphate, and supersonic of 45 kHz in frequency was irradiated. When the filled amount of the powdered ion exchange resin reached about 200 g/l-soln or more, the separation rate of crud began to decrease markedly, and, when the filled amount thereof was 100 g/l-soln or less, the recovery rate of the powdered ion exchange resin was lowered markedly. It is evident that, if the effect of the dispersing agent is too strong, the powdered ion exchange resin is dispersed so largely that the amount of the powdered ion exchange resin recovered from the resin discharge pipe 16 becomes decreased.

Figure 7:
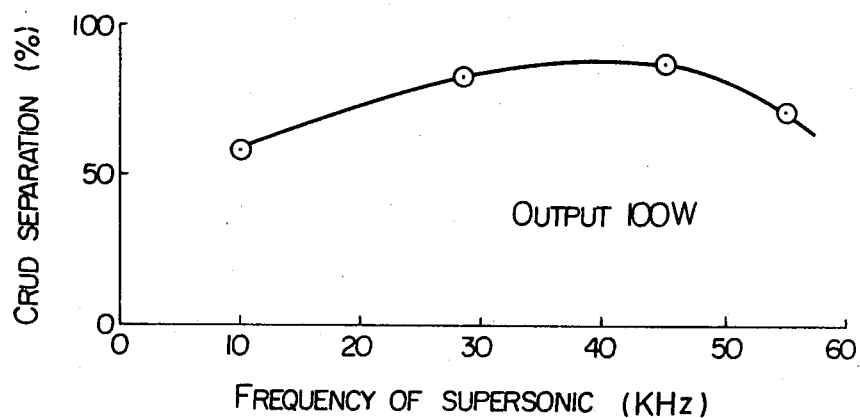
FIG. 7 is a characteristic figure showing the relation between the frequency of supersonic and the separation rate of crud.

FIG. 7 shows the relation between the frequency of the supersonic and the separation rate of crud. In this case, a solution containing 0.5% by weight of sodium hexamethaphosphate was blended with a slurry of the powdered ion exchange resin and supersonic of output 100 W was irradiated. It is evident from the figure that the separation rate of crud was high under the irradiation of supersonic in the range of 30 to 50 kHz in frequency. The separation rate of crud decreases markedly when the frequency of the supersonic reaches 50 kHz or more. This is because, when the frequency of the supersonic is too high, the shearing force due to the cavitation generated does not work effectively on the separation of crud.

Figure 8:
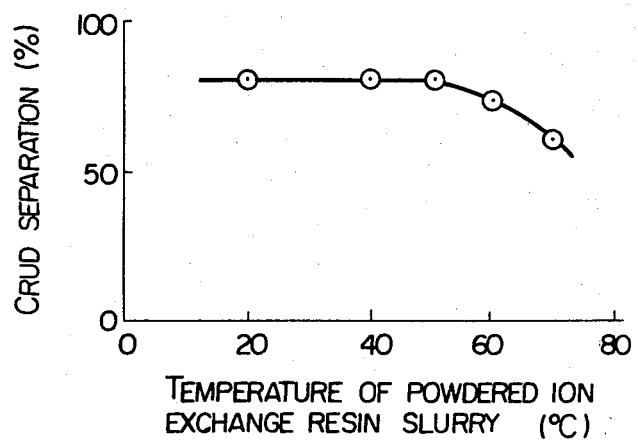
FIG. 8 is a characteristic figure showing the relation between the temperature of the powdered ion exchange resin slurry and the separation rate of crud.

Since separation of crud by supersonic is influenced by the shearing force due to the cavitation, it is also influenced by the temperature of a slurry of the powdered ion exchange resin. FIG. 8 shows the influence of the slurry temperature on the separation rate of crud. When the slurry temperature exceeds 50° C., the separation rate of crud decreases due to the decrease of surface tension of the liquid. It is therefore, desirable to carry out the separation of crud under irradiation of the supersonic at the slurry temperature of 50° C. or less. In this case too, a solution of 0.5% by weight of sodium hexamethaphosphate was used as a dispersing agent.

The characteristics shown in FIGS. 4 to 8 were the results of experiments in which the powdered ion exchange resin comprising mostly styrene-divinyl benzene copolymer was used. Said powdered ion exchange resin had a mean particle diameter of about 10 μm.

It was found through these tests for confirming characteristics that a high pH value of the slurry of the ion exchange resin is desirable when a chelating agent is used as a dispersing agent. If the pH value of the reactor water is about 6 to 7, the ability of the ion exchange resin has no troubles and, even if the pH value is lower than 6, it will exhibit its full effect. The present invention will be illustrated with reference to concrete examples.

EXAMPLE 1

To the used powdered ion exchange resin which was washed reversely from a condensate filter, and had a radioactivity concentration of 0.1 $\mu$Ci/ml and 8.5% by weight of iron oxide as the crud was added a solution containing 0.5% by weight of sodium hexamethaphosphate as a chelating agent, in an amount of 2 to 10 times as much based on the volume of the powdered ion exchange resin and the resulting mixture was allowed to stand for 30 minutes under the irradiation of supersonic of 45 kHz in frequency. After separation of the supernatant, the separation rate of crud which adhered to the powdered ion exchange resin was 88% or more. The radioactivity concentration at this time was less than 0.01 $\mu$Ci/ml. The radioactivity concentration of the powdered ion exchange resin was decreased to 1/10 or less of the original level by this operation.

EXAMPLE 2

Figure 9:
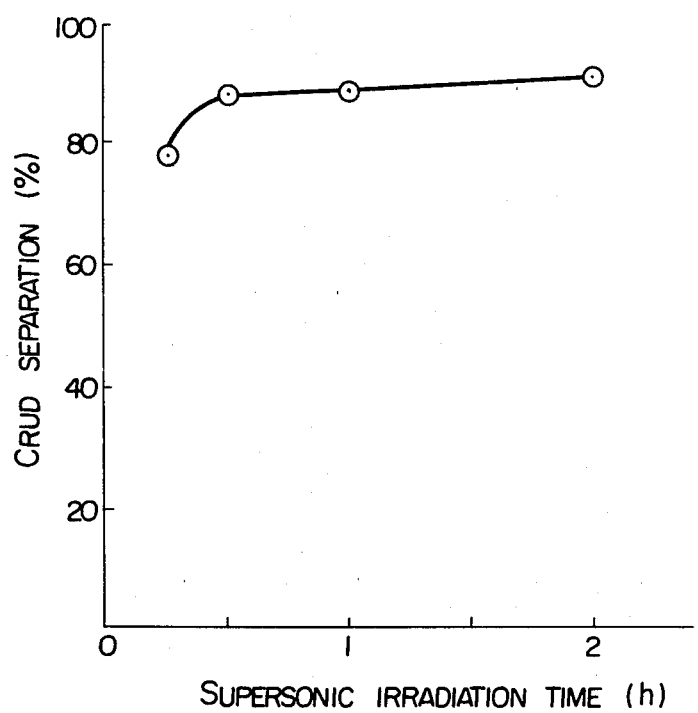
FIG. 9 is a characteristic figure showing the relation between the length of the irradiation time of supersonic and the separation rate of crud.

To 20 ml of the same powdered ion exchange resin as shown in Example 1 was added a solution containing 1% by weight of sodium hexamethaphosphate in an amount of 2 times as much and the resulting mixture was allowed to stand under the irradiation of supersonic (power output: 100 W) of 23 kHz in frequency. The relation between the length of treating time and the separation rate of crud after separation of the supernatant was shown in FIG. 9. The separation rate of crud remained almost constant in the treating time of 30 minutes or longer.

EXAMPLE 3

The powdered ion exchange resin containing 10% by weight of iron oxide as the crud and having a radioactivity concentration of 0.08 $\mu$Ci/ml was put into a separating liquid containing about 0.5% by weight of sodium citrate, which is another chelating agent, and having a pH value of 12. Supersonic of 23 kHz in frequency was irradiated thereonto. The separation was carried out in a flowing system and the separation liquid was passed through at SV=2. The length of time for the supersonic treatment could be selected optionally. However, the separation rate of crud reached as high as about 97% by the treatment for one hour. The radioactivity concentration of the dried powdered ion exchange resin was markedly reduced to 0.03 $\mu$Ci/ml.

Now, the separation characteristics obtained when an acid was used as a dispersing agent were shown below.

Figure 10:
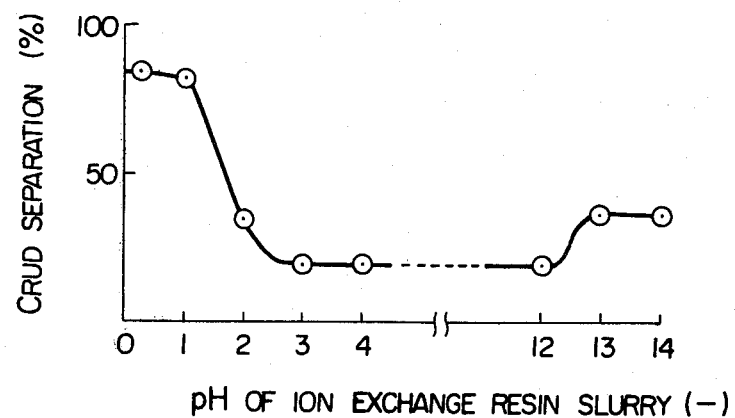
FIG. 10 is a characteristic figure showing the relation between the pH of the slurry adjusted by addition of an acid or an alkali and the separation rate of crud.

FIG. 10 shows the characteristics obtained when sulfuric acid was blended as a dispersing agent with a slurry of the ion exchange resin and supersonic of 45 kHz in frequency was irradiated thereonto. When the pH value was 3 or higher, the separation rate was about 20% and, when the pH value was 2, the separation rate was about 40%. When the pH value was 1, there was obtained the separation rate of about 80%. This indicates that the repellent force overcoming the readhesion force is obtained only when the pH value is 2 or less, desirably 1 or less. From the view-point of increasing the repellent force due to the surface charge, negatively charging by the addition of alkali is possible. However, according to the examination of the present inventors, addition of sodium hydroxide up to the pH value of 13 or 14 affords the separation rate of only about 40% and it has been confirmed that the efficiency of this method is low.

The concrete example wherein an acid is used as a dispersing agent is illustrated hereinbelow.

EXAMPLE 4

Figure 11:
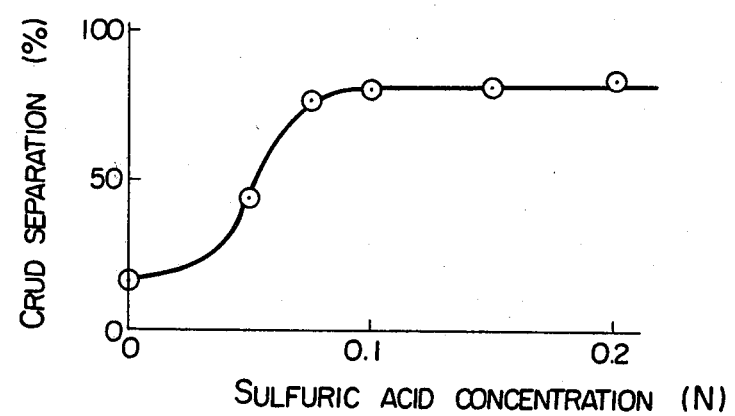
FIG. 11 is a characteristic figure showing the relation between the concentration of sulfuric acid and the separation rate of crud.

Sulfuric acid was used as a dispersing agent in this Example. To a slurry of the powdered ion exchange resin shown in Example 1 was added diluted sulfuric acid and admixed therewith, and supersonic of 45 kHz in frequency was irradiated thereonto. The relation between the concentration of sulfuric acid and separation rate of crud was shown in FIG. 11. In case that the concentration of sulfuric acid was 0.1 N or less, the separation rate of crud was markedly reduced. Though it was considered that the surface charge of crud varies by the addition of the acid, 10 g of the powdered ion exchange resin was added to 100 ml of the slurry, and this amount of acid was roughly proportional to the equivalent of the powdered ion exchange resin and did not contribute to an increase of the concentration of sulfuric acid, and hence the effect on the surface charge of the powdered ion exchange resin is great.

One of the usages of the ion exchange resin from which the crud was removed is the reuse as an ion exchange resin. When a chelating agent is used as a dispersing agent, the ion exchange resin has no ion exchanging ability when the crud is removed, because the ion exchange resin has absorbed the chelating agent. Therefore, first of all, the ion exchange resin is separated into the anion exchange resin and the cation exchange resin. The anion exchange resin and the cation exchange resin are washed with sodium hydroxide and sulfuric acid, respectively. These washing liquids are discarded as radioactive wastes but they are low in radioactivity because they do not contain the crud. When an acid is used as a dispersing agent, said regeneration operation becomes easy, because the cation exchange resin has already been regenerated by an acid added in the step of removing the crud. Consequently, the ion exchange resin from which the crud has been removed is, in the first step, separated into the cation and anion exchange resins and then only the anion exchange resin is regenerated by the addition of alkali.

Another usage of the ion exchange resin from which the crud has been removed is the use as a precoating material on the precoat type filters including the condensate demineralizer filter. In case that an acid is used as a dispersing agent, the ion exchange resin, particularly the cation exchange resin, from which the crud has been removed, is used as a precoating material on the holder of a condensate demineralizer filter because of the remaining ion exchanging ability thereof and its ion exchanging ability is utilized. In case that a chelating agent is used as a dispersing agent due to the lack of the ion exchanging ability, the ion exchange resin is used as a precoating material for the precoat type filter which is provided in the radioactive waste disposal system, for example, machinery drain disposal system of a power plant. According to the result of precoating on an element of the precoat type filter in the machinery drain disposal system, the initial differential pressure of the filter was 0.2 kg/cm$^2$, which was capable of removing the crud (iron oxide of 3 $\mu$m in average particle diameter) favorably, the removal rate of crud being as high as 99%. The powdered ion exchange resin is difficult in separating the cation exchange resin from the anion exchange resin, as compared with the granular ion exchange resin, and hence regeneration thereof is extremely difficult. Consequently, use of the powdered ion exchange resin as a precoating material is very significant. The above mentioned use of the powdered ion exchange resin does not generate the powdered ion exchange resin which becomes radioactive wastes and contributes to the reduction of the amount of radioactive wastes.

When the ion exchange resin is to be discarded, removal of crud is beneficial. When the radioactive wastes are stored in a container, it is required that the dosage of the container surface be 200 mRe/H or less. In contrast, when it is intended to discard the used ion exchange resin without the removal of crud, the radioactivity concentration of the ion exchange resin reaches 0.1 $\mu$Ci/ml and hence only about 20 kg is allowed to be contained in a drum of 200 l capacity when canned by the known cement-solidification method. On the other hand, according to the present invention, due to the removal of crud, the radioactivity concentration of the ion exchange resin is reduced to 0.05 $\mu$Ci/ml and hence it is possible to hold the dosage of the drum surface under the standard level or less even when about 40 kg of the ion exchange resin is packed in a drum of 200 l capacity. This effect results in the reduction of the number of drums for radioactive wastes.

What is claimed is:

1. A process for removing crud adsorbed on ion exchange resin and separating the ion exchange resin from the crud comprising:

providing a slurry comprising ion exchange resin having crud adsorbed thereon;

supersonically irradiating the slurry to excoriate and remove the crud from the surface of the ion exchange resin and to float the excoriated crud to the surface of the slurry;

reacting a dispersing agent with the excoriated crud to form a dispersed and stabilized colloid by charging the surface of the crud either positively or negatively to prevent the crud from readsorbing on the ion exchange resin due to static attraction; and separating a slurry containing the dispersed and stabilized colloid from the ion exchange resin from which the crud has been removed.

2. A process for removing the crud according to claim 1, wherein said dispersing agent is a chelating agent.

3. A process according to claim 2, wherein the ion exchange resin from which the crud has been removed comprises cation and anion exchange resins, wherein the anion and cation exchange resins are separated from each other, and further wherein the separated anion exchange resins are washed with sodium hydroxide and the separated cation resins are washed with sulfuric acid thereby regenerating the anion and cation exchange resins.

4. A process for removing the crud according to claim 1, wherein said dispersing agent is an acid.

5. A process for removing the crud according to claim 4, wherein the pH value of the slurry is adjusted to 2 or less by the addition of said acid.

6. A process according to claim 4, wherein the ion exchange resin from which the crud has been removed comprises anion exchange resins and cation exchange resins, wherein the anion and cation exchange resins are separated from each other, and further wherein the separated anion exchange resins are washed with sodium hydroxide thereby regenerating the anion and cation exchange resins.

7. A process according to claim 1, wherein a coagulating agent capable of neutralizing the surface charge of the crud is added to the separated slurry containing the dispersed and stabilized colloid to coagulate the crud and to separate the crud from the slurry by precipitation.

8. A process for removing the crud according to claim 7, wherein said dispersing agent is added to the slurry after separation of said crud by precipitation and the resulting mixture is fed to the slurry of the ion exchange resin.

9. A process according to claim 1, wherein the dispersing agent is added to the slurry comprising ion exchange resin having crud adsorbed thereon before the slurry is supersonically irradiated.

10. A process according to claim 9, wherein the concentration of the ion exchange resin having crud adsorbed thereon is in the range of 100-200 g/l solution of slurry.

11. A process according to claim 1, wherein the irradiation is conducted at a temperature not greater than 50° C.

12. A process according to claim 1, wherein the pH of the slurry comprising ion exchange resin having crud adsorbed thereon is in the range of 6-7.

13. A process according to claim 1, including supersonically irradiating the slurry at a frequency of 20-60 kHz for 30 minutes or more.

14. A process for removing crud adsorbed on ion exchange resin and separating the ion exchange resin from the crud comprising:

providing a slurry comprising ion exchange resin having crud adsorbed thereon;

supersonically irradiating the slurry at a frequency of 20-60 kHz to excoriate and remove the crud from the surface of the ion exchange resin and to float the excoriated crud to the surface of the slurry;

reacting a 0.5% by weight or more solution of sodium hexamethaphosphate with the excoriated crud to form a dispersed and stabilized colloid by charging the surface of the crud either positively or negatively to prevent the crud from readsorbing on the ion exchange resin due to static attraction; and separating a slurry containing the dispersed and stabilized colloid from the ion exchange resin from which the crud has been removed.

15. A process according to claim 14, wherein the sodium hexamethanphosphate solution is added in a volume amount in the range of 2-10 times the volume of the ion exchange resin having crud adsorbed thereon.

16. A process for removing crud adsorbed on ion exchange resin and separating the ion exchange resin from the crud comprising:

providing a slurry comprising ion exchange resin having crud adsorbed thereon;

supersonically irradiating the slurry at a frequency of 20-60 kHz to excoriate and remove the crud from the surface of the ion exchange resin and to float the excoriated crud to the surface of the slurry;

reacting a 0.1 N or more solution of sulfuric acid with the excoriated crud to form a dispersed and stabilized colloid by charging the surface of the crud either positively or negatively to prevent the crud from readsorbing on the ion exchange resin due to static attraction; and separating a slurry containing the dispersed and stabilized colloid from the ion exchange resin from which the crud has been removed.

* * * * *